United States Patent
Chiaraviglio et al.

(10) Patent No.: US 12,425,418 B2
(45) Date of Patent: Sep. 23, 2025

(54) MALICIOUS WEBSITE DETECTION USING CERTIFICATE CLASSIFIER

(71) Applicant: Zimperium, Inc., Dallas, TX (US)

(72) Inventors: Nicolás Chiaraviglio, Barcelona (ES); Santiago Andrés Rodriguez Gonzalez, Córdoba (AR)

(73) Assignee: Zimperium, Inc., Dallas, TX (US)

( * ) Notice: Subject to any disclaimer, the term of this patent is extended or adjusted under 35 U.S.C. 154(b) by 249 days.

(21) Appl. No.: 17/900,651

(22) Filed: Aug. 31, 2022

(65) Prior Publication Data

US 2024/0073225 A1 Feb. 29, 2024

(51) Int. Cl.
H04L 9/40 (2022.01)

(52) U.S. Cl.
CPC ...... H04L 63/1416 (2013.01); H04L 63/1441 (2013.01)

(58) Field of Classification Search
CPC ............. H04L 63/1416; H04L 63/1441; H04L 63/0823; H04L 63/1483
See application file for complete search history.

(56) References Cited

U.S. PATENT DOCUMENTS

| | | | |
|---|---|---|---|
| 9,300,686 B2* | 3/2016 | Pidathala | G06F 21/562 |
| 2016/0380977 A1* | 12/2016 | Bean | G06F 21/566 |
| | | | 726/12 |
| 2020/0252428 A1* | 8/2020 | Gardezi | H04L 63/1416 |
| 2021/0120035 A1* | 4/2021 | Onut | H04L 63/1483 |
| 2021/0203690 A1* | 7/2021 | Nunes | G06N 3/088 |
| 2021/0320946 A1* | 10/2021 | Boshmaf | H04L 63/0823 |
| 2023/0075094 A1* | 3/2023 | Xu | H04L 63/0245 |
| 2023/0098812 A1* | 3/2023 | Rivlin | H04L 63/0236 |
| | | | 726/22 |

FOREIGN PATENT DOCUMENTS

EP 4293956 A1 * 12/2023 ........... G06F 21/554

OTHER PUBLICATIONS

Homayoun, S. et al., "Detecting Ambiguous Phishing Certificates using Machine Learning," In Proceedings of 36th International Conference on Information Networking IEEE. Jan. 12, 2022, pp. 1-6.
Li, J. et al., "Machine Learning-Based Malicious X.509 Certificates' Detection," Applied Sciences 11, No. 5, 2164, Mar. 1, 2021, pp. 1-24.

* cited by examiner

*Primary Examiner* — Kambiz Zand
*Assistant Examiner* — Afaq Ali
(74) *Attorney, Agent, or Firm* — Fenwick & West LLP (57) ABSTRACT

A system and a method are disclosed for detecting a malicious website. In an embodiment, a computing device detects a uniform resource locator (URL) referencing an unknown website; pre-processes the URL to determine a first probability that the unknown website is malicious; and inputs the first probability into a machine learning model to receive a second probability that the unknown website is malicious. The machine learning model is trained using Secure Sockets Layer (SSL) certificates of known legitimate websites and known malicious websites. The computing device further determines whether the second probability is associated with at least a threshold risk. Responsive to the second probability being associated with at least the threshold risk, the computing device causes a graphical user interface of a client device to display a notification indicating a level of risk associated with the unknown website.

17 Claims, 5 Drawing Sheets

MALICIOUS WEBSITE DETECTION USING CERTIFICATE CLASSIFIER

TECHNICAL FIELD

The disclosure generally relates to the field of data security, and more particularly relates to detecting malicious website using certificate classifier.

BACKGROUND

Computing devices are prone to risk from malicious websites. For example, users often navigate from website to website using links whose underlying universal resource locators (URLs) may be hidden or obscured by the text of a hyperlink. Existing tools for detecting whether a website encountered in network traffic are processing-intensive and often require analysis of a full URL of the unknown website. Thus, these classifiers are located on remote servers, resulting in large bandwidth consumption, high latency, and delayed processing, as well as potential tampering of the traffic by an attacker that can block the potential analysis. Additionally, in some cases, the landing page of an unknown domain does not include a full URL. For example, one or more of the subdomain, domain, or path may be missing, or only the certificate of the unknown website is available. Therefore, a more accurate classifier for detecting a malicious website is necessary.

SUMMARY

Systems and methods are disclosed herein for detecting a malicious website. In an embodiment, a machine learning model specific to a computing device is trained using Secure Sockets Layer (SSL) certificates of known legitimate websites and known malicious websites. The computing device detects a URL referencing an unknown website. Responsive to detecting the URL, the computing device pre-processes the URL to determine a first probability that the unknown website is malicious; inputs the first probability into a machine learning model to receive a second probability that the unknown website is malicious. Based on the determined second probability, the computing device determines if the unknown website is malicious. The computing device performs a security action responsive to determining that the website is malicious.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes a security module that enables a computing device to detect a malicious website. The security module retrieves a domain or a partial URL of an unknown website, such as a website that has an unrecognized domain, the unknown website being linked to on an open page or a software application. The security module pre-processes the domain or partial URL to determine a first probability that the unknown website is malicious and inputs the first probability and additional probabilities of subject alternative names (SAN) websites into a machine learning model to determine whether the unknown website is malicious. Where the unknown website is malicious, the security module performs a security action (e.g., prevents access to the malicious website, quarantines a link, etc.). Alternatively, the machine learning model may be trained to pre-process the domain or partial URL. In this way, the identified URL may be directly input into the machine learning model and output a probability that unknown website is malicious.

System Overview

Figure 1:
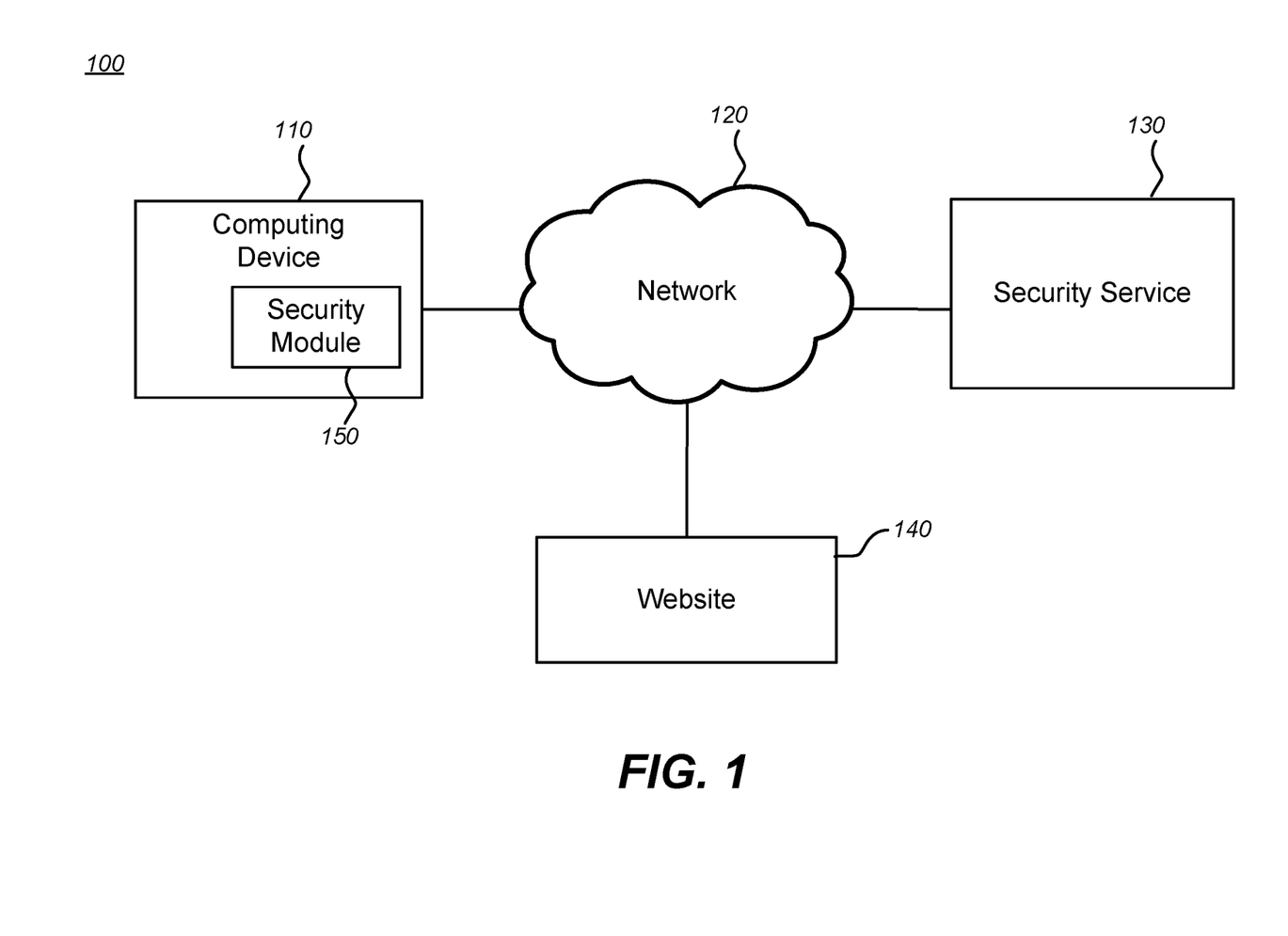
FIG. 1 illustrates one embodiment of a system environment including a computing device with a security module, according to one or more embodiments.

Figure (FIG. 1 illustrates one embodiment of a system environment including a computing device with a security module. Environment 100 includes computing device 110 with security module 150 installed thereon. Environment 100 also includes network 120, security service 130, and website 140. Computing device 110 may include a personal computer, a desktop, a laptop, a smart phone, a tablet, a wearable computing device such as a smart watch, an Internet-of-Things (IoT) device, and the like. As computing device 110 encounters network traffic from network 120 relating to a website 140, security module 150 determines whether website 140 is malicious. Network 120 may be any network, such as the Internet. Security module 150 performs this task by analyzing network traffic for security risks, and taking action where security risks are found (e.g., logging the encounter, alerting the user of device 110, etc.). Security module 150 may run in a virtual private network (VPN) that tracks network traffic.

Security service 130 may provide security module 150 to computing device 110 for installation and may store classifiers and data not suitable for storage on computing device 110 (e.g., due to memory limitations on computing device 110). While security service 130 is depicted as a single entity in environment 100, this is for convenience; security service 130 may be distributed across multiple servers, and the functionality of security service 130 may, in whole or in part, be stored in computing device 110 as part of security module 150. Further details about security module 150 are described below with reference to FIGS. 2-3.

Security Module Configuration

Figure 2:
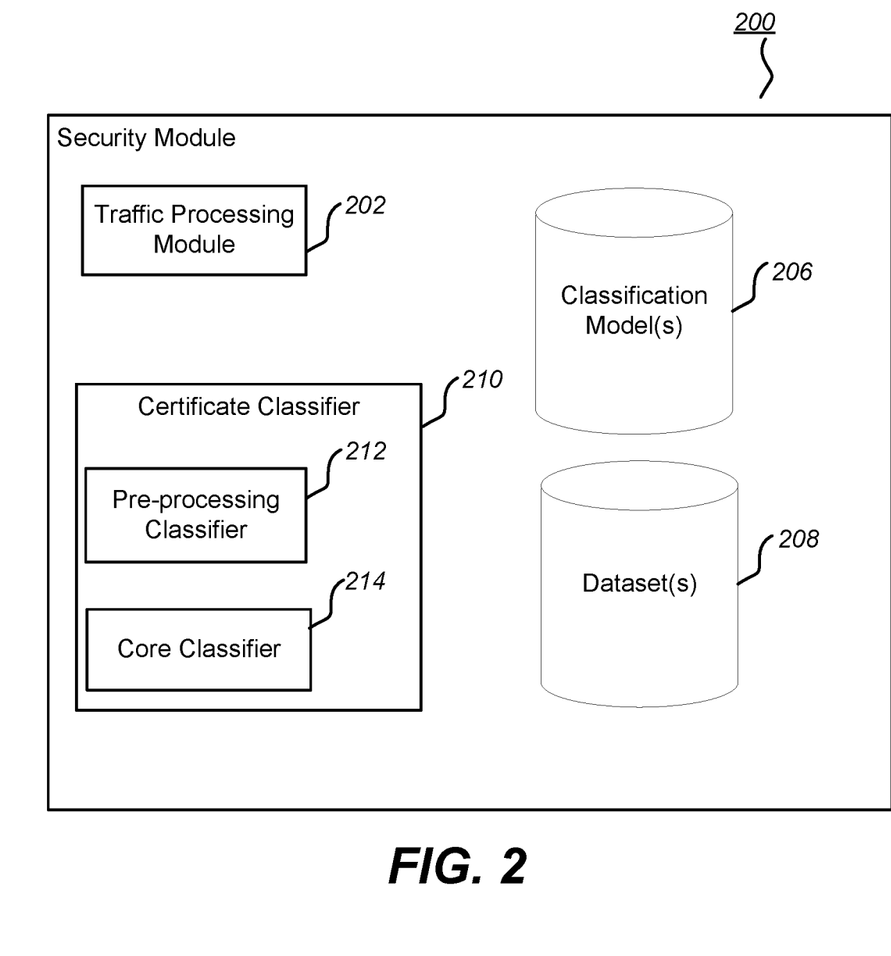
FIG. 2 illustrates one embodiment of exemplary sub-modules of a security module, according to one or more embodiments.

FIG. 2 illustrates one embodiment of exemplary sub-modules of a security module. Security module 200 includes all functionality described with respect to security module 150, and vice versa. Security module 200 includes traffic processing module 202, classification model(s) 206, and dataset(s) 208, and a certificate classifier 210. The modules and classifiers depicted with respect to security module 200 are exemplary; more or fewer modules, classifiers, and data may be used, consistent with the disclosure provided herein.

Traffic processing module 202 detects and analyzes network traffic. Network traffic includes any traffic received by computing device 110 from network 120. In an exemplary embodiment, traffic processing module 202 analyzes network traffic received when computing device 110 is in a VPN session. Traffic processing module 202 may detect network traffic when a user navigates a browser to a page, when a user launches or operates an application on computing device 110, when computing device 110 makes a data call over network 120 for any pre-programmed reason, when the user receives an email with a link to a website, and the like.

Traffic processing module 202 identifies whether the network traffic includes one or more URLs. To identify whether the network traffic includes a URL, traffic processing module 202 analyzes network traffic (e.g., header or payload information of network packets) for patterns that match known patterns of URLs. For example, traffic processing module 202 may compare text in data packets to one or more URL templates, each template indicating a known format of a URL (e.g., "http://www."; "https://www."; "https://goo.gl" are all known prefixes for URLs). The URL templates may be stored local to security module 150, or by security service 130, and may be periodically updated. Traffic processing module 202 identifies a URL when a string of characters in network traffic matches a known pattern. In some embodiments, when a user navigates a browser to a landing page of a domain, the traffic processing module 202 may detect the URL of the landing page and send the URL to the certificate classifier 210 for detection of a malicious domain. In some embodiments, the identified URL may be not a full URL that include subdomain, domain, and path of the website. The identified URL may be a partial URL that is used for referencing a domain or website.

The certificate classifier 210 includes a pre-processing classifier 212 and a core classifier 214. The pre-processing classifier 212 pre-processes the identified partial URL of the landing page of the domain. The output of the pre-processing classifier 212 is input to the core classifier 214 and the core classifier 214 is configured to classify a website/domain as phishing or legitimate using a classification model 206. In some embodiments, the classification model 206 may include a machine learning model.

Figure 3:
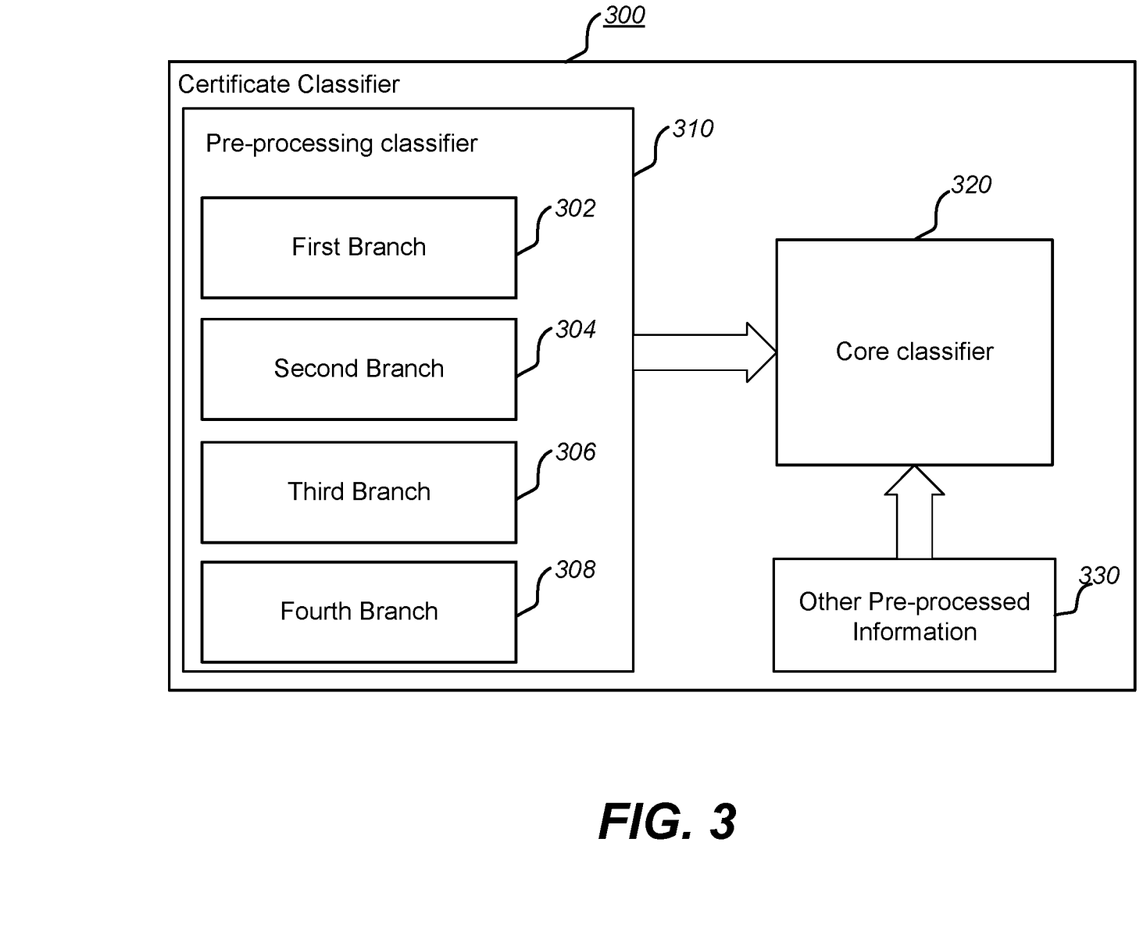
FIG. 3 illustrates one embodiment of exemplary certificate classifier used by a security module, according to one or more embodiments.

The pre-processing classifier 212 pre-processes URLs identified in network traffic for security risks. As used herein, the term security risk refers to a website that may be malicious. A malicious website may be a website that is a phishing website. A phishing website may be a website that imitates a legitimate website, but is not the legitimate website. In order to determine whether a URL poses a security risk, the URL is first input into the pre-processing classifier 212. The pre-processing classifier 212 then outputs a probability of the URL being a malicious website. The probability may be used as input to the core classifier 214, along with other pre-processed information, to determine whether a security risk exists. The pre-processing classifier 212 may use one or more classification model(s) 206 to determine the probability. The classification model 206 may include a machined learned model. Turning to FIG. 3, where the certificate classifier 210 are expanded upon, FIG. 3 illustrates one embodiment of exemplary certificate classifier used by a security module. The certificate classifier 300 include the same weight of description provided with respect to the certificate classifier 210, and vice versa. The pre-processing classifier 310 include a first branch 302, a second branch 304, a third branch 306, and a fourth branch 308.

In an embodiment, the pre-processing classifier 310 sends, as input to the first branch 302, an identified partial URL. The first branch 302 takes the identified partial URL and uses character level embedding to identify the pattern of the partial URL by looking at their character level compositions, e.g., English characters, numerical number, special characters, etc. The first branch 302 may encode the characters in the URL into sequences of vectors, and apply one dimensional convolutional neural network (1D CNN) to learn the sequences and identify the pattern of the characters of the URL. The pre-processing classifier 310 determines whether the URL relates to a malicious website based on the identified patterns. In some embodiments, the pre-processing classifier 310 may use a machine learning model that is trained with known legitimate URLs and known phishing URLs. Different patterns that correspond to legitimate URLs and phishing URLs can be generated during the process. The pre-processing classifier 310 may input the identified pattern of the partial URL into the machine learning model and output a probability of the identified pattern being related to a malicious website.

In an embodiment, the pre-processing classifier 310 sends the identified URL as input to the second branch 304. The second branch 304 analyzes the URL by looking at their word level compositions. The second branch 304 may split the URL into their constituent words, and compare the identified words to a database of frequently used words by phishing website. In some embodiments, the training data may be stored in the dataset(s) 208. Alternatively, the training data may be provided by the security service 130. If the comparison yields a match, then the pre-processing classifier 310 may determine a high likelihood of the URL being associated with a malicious website.

In the third branch 306, the pre-processing classifier 310 sends the identified URL as input to the third branch 306. The third branch 306 analyzes the URL at the structural level of the URL. The third branch 306 may split the URL based on the logical structure of the URL, e.g., considering the portion of the URL between signs "." and/or "/" as a single word. The third branch 306 then compare the identified portion to known domains, including known trusted domains and known phishing domains. Based on the comparison, the pre-processing classifier 310 may determine the probability of the URL being associated with a malicious website.

In an embodiment, the pre-processing classifier 310 may further send the identified URL to the fourth branch 308 for additional classifications. The fourth branch 308 may be configured to calculate an entropy value of the URL. An entropy of a URL is a measurement of randomness of the URL. As many phishing websites are created with random domain names, the entropy value of the URL can be used to estimate the probability of the URL being associates with a malicious website.

The pre-processing classifier 310 may concatenate the outputs of the four branches and outputs a probability of the URL being associated with a malicious website. The output of pre-processing classifier 310 includes a vector stating probability that URL is phishing or legitimate. The outputs of the four branches may be used as four vectors and are concatenated one after another to generate a larger vector. The pre-processing classifier 310 then inputs the generated larger vector to a model to output a probability indicating the partial URL is phishing or legitimate.

The pre-processing classifier 310 may further process the Secure Sockets Layer (SSL) certificate of the website to extract features of the subject alternative names (SAN) websites. The SAN websites are the domains for which the SSL certificate is valid. Based on the extracted features of the SAN websites, the pre-processing classifier 310 may further determine a maximum probability, a minimum probability and a mean probability of all SAN websites being malicious. The determined four probabilities, including the three probabilities of the SAN websites and the probability of the URL output by the pre-processing classifier 310, are input to the core classifier 320, along with other pre-processed information 330, to further determine whether the associated domain is malicious or not.

The core classifier 320 may take a plurality of features as input to calculate the final probability. Other than the four probabilities discussed above, the core classifier 320 may be configured to input other pre-processed information 330. The other pre-processed information 330 may include features associated with the SSL certificate, such as, number of days the certificate being valid, number of domains in the SAN, number of extensions in the certificate, issue common name, subject common name, etc.

In some embodiments, some of the pre-processed information 330 is associated with the certificate of the unknown website. To obtain the pre-processed information 330, text relates to the certificate can be extracted and compared with the certificates of the known legitimate websites that are stored in the dataset(s) 208. Frequency distribution of letters can be calculated for the extracted text, and one or more statistical tests can be applied to the frequency distributions to evaluate the difference between the certificate of the unknown website and the legitimate websites. The result of the distribution may be a value indicating the distance between the measured input (e.g., letter, text) and the statistical distribution of English language. In some situations, the distribution of letters in a certificate of a legitimate website versus a certificate of a malicious website can be very different, and statistical metrics, such as, Euclidean distance, Kolmogorov Smirnov distance, Kullback Leibler divergence, etc., can be used to evaluate differences.

The core classifier 320 uses a classification model 206 to determine a probability. In some embodiments, the classification model 206 may be a machine learning model. In one example, the core classifier 320 is a Random Forest Classifier (RF), which is trained with more than 2 million web sites and SSL certificates. In some embodiments, the training data may be stored in the dataset 208. Alternatively, the training data may be provided by the security service 130. The training data may include a set of known legitimate SSL certificates and known phishing certificates. The features of the certificates in the training data are used to train the machine learning model. Additionally, the output of the pre-processing classifier 310 can also be used as input for training the classification model 206. The core classifier 320 uses serial statistical measurements to check similarity and/or distance between the features of a website and the features of the legitimate/phishing certificates to determine whether a website is malicious or not. In some embodiments, the statistical measurements may include Euclidean distance, Kolmogorov Smirnov distance, Kullback Leibler divergence, etc.

Based on the final probability output by the certificate classifier 300, the security module 200 may determine whether the final probability is associated with at least a threshold risk. If the final probability is associated with a threshold risk, the security module 200 may send a notification to the user by displaying the notification in a graphical user interface of the client device 110 and the notification indicates a level of risk associated with the website.

Figure 4:
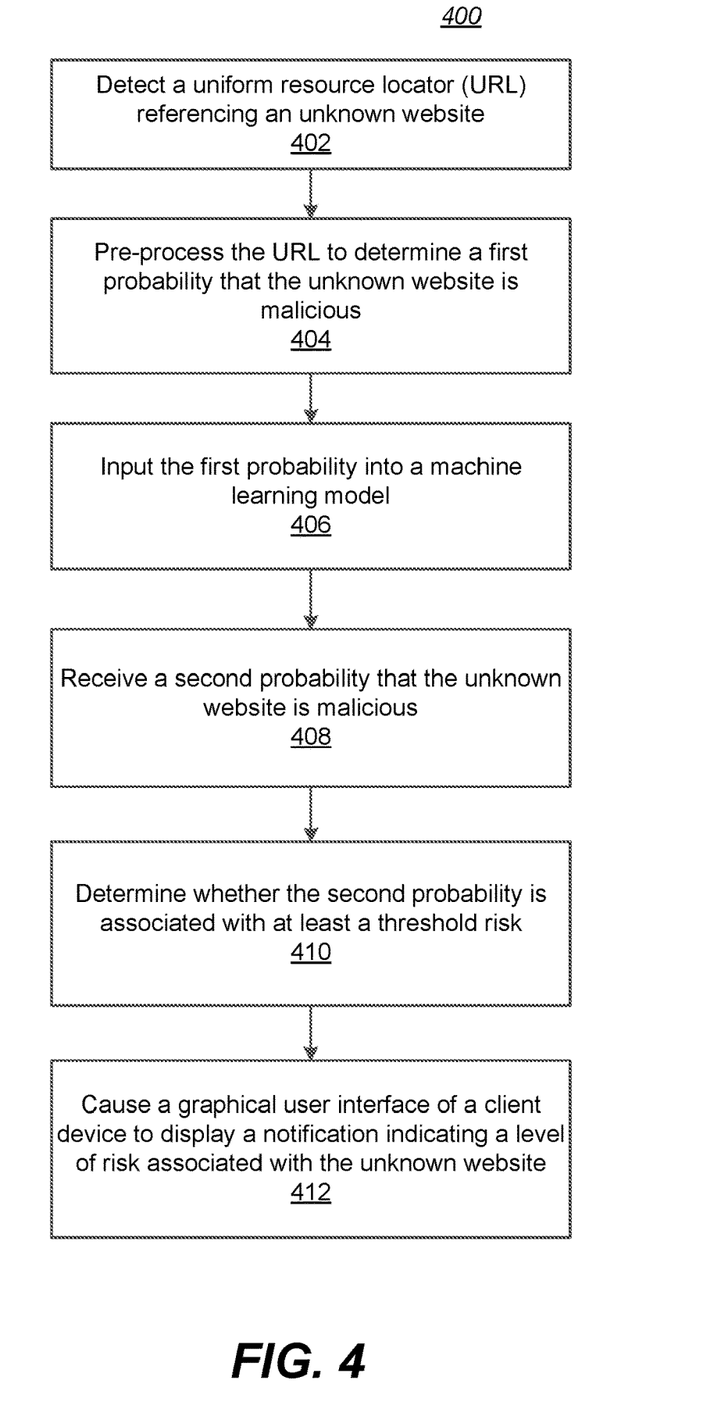
FIG. 4 illustrates one embodiment of a process for detecting a malicious website, according to one or more embodiments.

FIG. 4 illustrates one embodiment of a process 400 for detecting a malicious website. A computing device 110 (e.g., computer, mobile device 110) detects 402 a URL referencing an unknown website. The URL may relate to a landing page of a domain. In some embodiments, the URL may be partial URL that is used for referencing a domain or website. Responsive to detecting the URL, the computing device may pre-process 404 the URL to determine a first probability that the unknown website is malicious. The computing device 110 then inputs 406 the first probability into a machine learning model. The machine learning model is trained using SSL certificates of known legitimate websites and known malicious websites. The computing device 110 receives 408, as output from the machine learning model, a second probability that the unknown website is malicious. Based on the second probability, the computing device 110 determines 410 whether the second probability is associated with at least a threshold risk. Responsive to the second probability being associated with at least the threshold risk, the computing device 110 causes 412 a graphical user interface of a client device to display a notification indicating a level of risk associated with the unknown website.

The computing device 110 may use one or more classification models to determine the first probability. In some embodiments, pre-processing the URL may include four branches, and each branch outputs a probability of the URL being related to a malicious website. The outputs of the four branches may be concatenated and used by the computing device 110 to output the first probability. In some embodiments, the computing device 110 may determine an SSL certificate associated with the URL and SAN websites associated with the determined SSL certificate. The computing device 110 extracts features of the associated SAN websites and calculate a maximum probability, a minimum probability and a mean probability of the associated SAN websites being malicious. The first probability and the probabilities associated with the SAN websites can all be input to the machine learning model to output the second probability. In some embodiments, the input of the machine learning model further comprises one or more of: number of days the SSL certificate being valid, number of domains associated with the SAN websites, number of extensions in the SSL certificate, issue common name of the SAN websites, and subject common name of the SAN websites.

Figure 5:
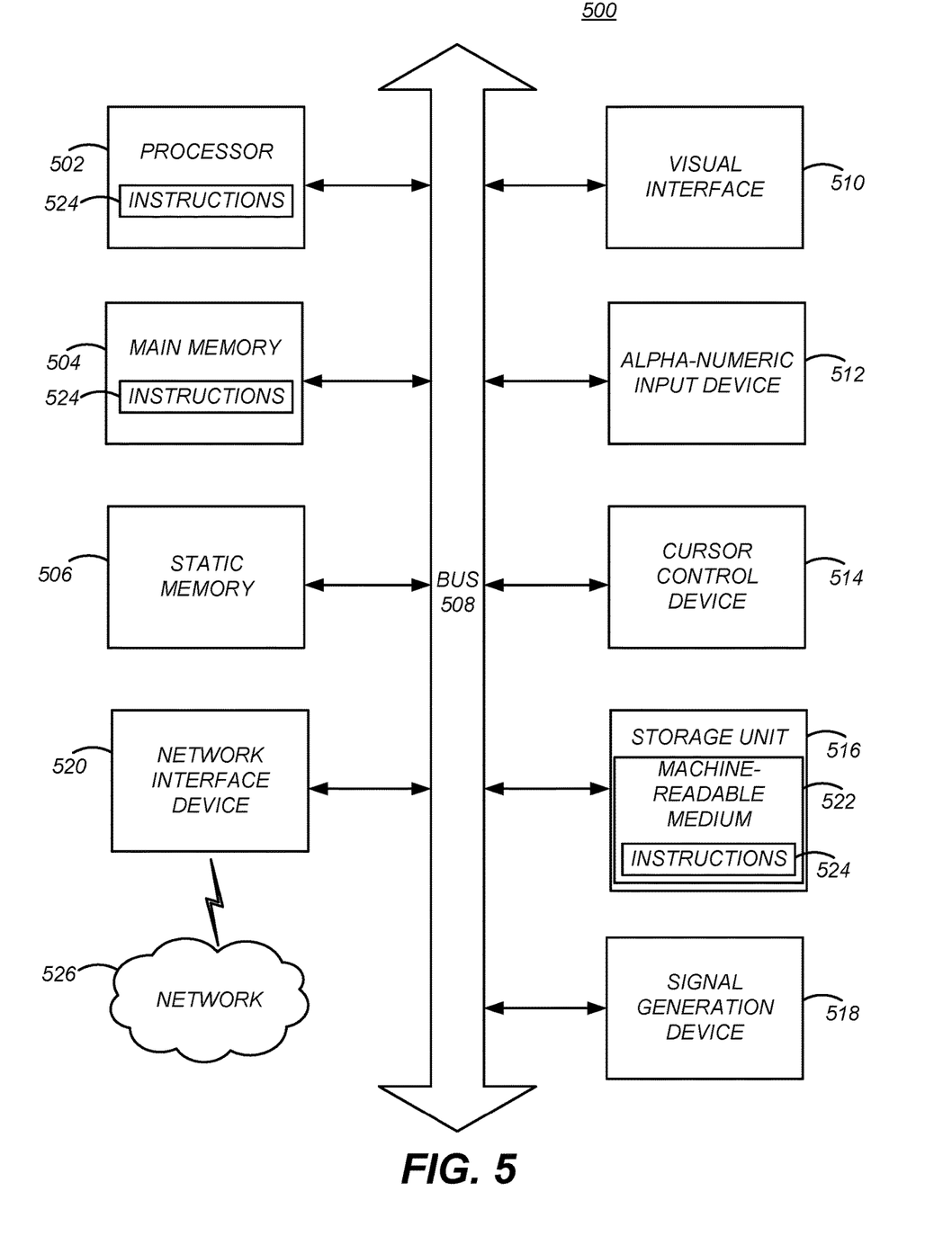
FIG. 5 is a block diagram illustrating components of an example machine able to read instructions from a machine-readable medium and execute them in a processor (or controller), according to one or more embodiments.

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a tablet, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for using a certificate classifier to determine whether the unknown website is malicious through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   detecting, by a computing device, a uniform resource locator (URL) referencing an unknown website;
   pre-processing the URL to determine a first probability that the unknown website is malicious, wherein pre-processing the URL comprises:
      applying a classifier to the URL, the classifier comprising a set of branches, each branch configured to analyze a respective feature of the URL to output a result of whether the URL is related to a malicious website based on the respective feature; and
      concatenating a respective result from each branch to generate a vector as an input to a machine learning model, the vector comprising the first probability of the URL being associated with a malicious website;
   inputting the vector into the machine learning model, the machine learning model trained using Secure Sockets Layer (SSL) certificates of known legitimate websites and known malicious websites;
   receiving, as output from the machine learning model, a second probability that the unknown website is malicious, wherein the second probability is based at least on a similarity between an SSL certificate associated with the unknown website and the SSL certificates of one or more of the known legitimate websites and known malicious website;
   determining whether the second probability is associated with at least a threshold risk comprising a pre-determined probability value; and
   responsive to determining that the second probability is associated with at least the threshold risk, causing a graphical user interface of a client device to display a notification indicating a security risk associated with the unknown website.

2. The method of claim 1, further comprising:
   determining an SSL certificate associated with the URL;
   determining a subject alternative names (SAN) websites associated with the determined SSL certificate;
   extracting features of the associated SAN websites; and
   calculating a maximum probability, a minimum probability and a mean probability of the associated SAN websites being malicious.

3. The method of claim 1, wherein input of the machine learning model further comprises one or more of: number of days the SSL certificate being valid, number of domains associated with SAN websites, number of extensions in the SSL certificate, issue common name of the SAN websites, and subject common name of the SAN websites.

4. The method of claim 1, wherein pre-processing the URL to determine the first probability comprises:
   applying a character level embedding to identify a pattern of the URL; and
   determining the first probability based on the identified pattern.

5. The method of claim 1, wherein pre-processing the URL to determine the first probability comprises:
   applying a word level embedding to identify words in the URL; and
   determining the first probability based on the identified words.

6. The method of claim 1, wherein pre-processing the URL to determine the first probability comprises:
   splitting the URL based on logical structure of the URL to identify a portion of the URL;
   comparing the identified portion of the URL to known domains; and
   determining the first probability based on the comparison.

7. The method of claim 1, wherein pre-processing the URL to determine the first probability comprises:
   calculating an entropy value of the URL; and
   determining the first probability based on the calculated entropy value.

8. A non-transitory computer readable medium comprising memory with instructions stored thereon, the instructions, when executed by one or more processors, causing the one or more processors to:
   detect a uniform resource locator (URL) referencing an unknown website;
   pre-process the URL to determine a first probability that the unknown website is malicious, wherein pre-processing the URL comprises:
      applying a classifier to the URL, the classifier comprising a set of branches, each branch configured to analyze a respective feature of the URL to output a result of whether the URL is related to a malicious website based on the respective feature; and
      concatenating a respective result from each branch to generate a vector as an input to a machine learning model, the vector comprising the first probability of the URL being associated with a malicious website;
   input the vector into the machine learning model, the machine learning model trained using Secure Sockets Layer (SSL) certificates of known legitimate websites and known malicious websites;
   receive, as output from the machine learning model, a second probability that the unknown website is malicious, wherein the second probability is based at least on a similarity between an SSL certificate associated with the unknown website and the SSL certificates of one or more of the known legitimate websites and known malicious website;
   determine whether the second probability is associated with at least a threshold risk comprising a pre-determined probability value; and
   responsive to determining that the second probability is associated with at least the threshold risk, cause a graphical user interface of a client device to display a notification indicating a security risk associated with the unknown website.

9. The non-transitory computer readable medium of claim 8, wherein the instructions when executed by the one or more processors further cause the one or more processors to:
   determine an SSL certificate associated with the URL;
   determine subject alternative names (SAN) websites associated with the determined SSL certificate;
   extract features of the associated SAN websites; and
   evaluate a maximum probability, a minimum probability and a mean probability of the associated SAN websites being malicious.

10. The non-transitory computer readable medium of claim 8, wherein input of the machine learning model further comprises one or more of: number of days the SSL certificate being valid, number of domains associated with SAN websites, number of extensions in the SSL certificate, issue common name of the SAN websites, and subject common name of the SAN websites.

11. The non-transitory computer readable medium of claim 8, wherein the instructions to pre-process the URL to determine the first probability when executed by the one or more processors further cause the one or more processors to:
  apply a character level embedding to identify a pattern of the URL; and
  determine the first probability based on the identified pattern.

12. The non-transitory computer readable medium of claim 8, wherein the instructions to pre-process the URL to determine the first probability when executed by the one or more processors further cause the one or more processors to:
  apply a word level embedding to identify words in the URL; and
  determine the first probability based on the identified words.

13. The non-transitory computer readable medium of claim 8, wherein the instructions to pre-process the URL to determine the first probability when executed by the one or more processors further cause the one or more processors to:
  split the URL based on logical structure of the URL to identify a portion of the URL;
  compare the identified portion of the URL to known domains; and
  determine the first probability based on the comparison.

14. The non-transitory computer readable medium of claim 8, wherein the instructions to pre-process the URL to determine the first probability when executed by the one or more processors further cause the one or more processors to:
  calculate an entropy value of the URL; and
  determine the first probability based on the calculated entropy value.

15. A system comprising:
  one or more computer processors; and
  a non-transitory computer-readable storage medium for storing instructions that, when executed by the one or more computer processors, cause the one or more computer processors to perform operations comprising:
    detecting a uniform resource locator (URL) referencing an unknown website;
    pre-processing the URL to determine a first probability that the unknown website is malicious, wherein pre-processing the URL comprises:
      applying a classifier to the URL, the classifier comprising a set of branches, each branch configured to analyze a respective feature of the URL to output a result of whether the URL is related to a malicious website based on the respective feature; and
      concatenating a respective result from each branch to generate a vector as an input to a machine learning model, the vector comprising the first probability of the URL being associated with a malicious website;
    inputting the vector into the machine learning model, the machine learning model trained using Secure Sockets Layer (SSL) certificates of known legitimate websites and known malicious websites;
    receiving, as output from the machine learning model, a second probability that the unknown website is malicious, wherein the second probability is based at least on a similarity between an SSL certificate associated with the unknown website and the SSL certificates of one or more of the known legitimate websites and known malicious website;
    determining whether the second probability is associated with at least a threshold risk comprising a pre-determined probability value; and
    responsive to determining that the second probability is associated with at least the threshold risk, causing a graphical user interface of a client device to display a notification indicating a security risk associated with the unknown website.

16. The system of claim 15, wherein pre-processing the URL further comprises:
  determining an SSL certificate associated with the URL;
  determining subject alternative names (SAN) websites associated with the determined SSL certificate;
  extracting features of the associated SAN websites; and
  calculating a maximum probability, a minimum probability and a mean probability of the associated SAN websites being malicious.

17. The system of claim 15, wherein input of the machine learning model further comprises one or more of: number of days the SSL certificate being valid, number of domains associated with SAN websites, number of extensions in the SSL certificate, issue common name of the SAN websites, and subject common name of the SAN websites.

* * * * *